(12) United States Patent
Chiba

(10) Patent No.: US 7,671,898 B2
(45) Date of Patent: Mar. 2, 2010

(54) COLOR-SPACE TRANSFORMATION-MATRIX CALCULATING METHOD AND IMAGE PROCESSING DEVICE

(75) Inventor: Toru Chiba, Tokyo (JP)

(73) Assignee: Hoya Corporation, Tokyo (JP)

( * ) Notice: Subject to any disclaimer, the term of this patent is extended or adjusted under 35 U.S.C. 154(b) by 1071 days.

(21) Appl. No.: 11/340,628

(22) Filed: Jan. 27, 2006

(65) Prior Publication Data

US 2006/0170942 A1 Aug. 3, 2006

(30) Foreign Application Priority Data

Jan. 28, 2005 (JP) ............................ P2005-021581

(51) Int. Cl.
*H04N 5/228* (2006.01)

(52) U.S. Cl. ................................................. 348/222.1

(58) Field of Classification Search .............. 348/223.1, 348/222.1; 358/1.9
See application file for complete search history.

(56) References Cited

U.S. PATENT DOCUMENTS

| | | | |
|---|---|---|---|
| 6,278,533 B1 | 8/2001 | Takemoto | |
| 6,400,843 B1 * | 6/2002 | Shu et al. | 382/167 |
| 7,098,965 B2 * | 8/2006 | Kim | 348/649 |
| 7,148,996 B2 * | 12/2006 | Yeo et al. | 358/1.9 |
| 7,382,379 B1 * | 6/2008 | Edge et al. | 345/600 |
| 7,436,996 B2 * | 10/2008 | Ben-Chorin et al. | 382/167 |
| 2002/0012463 A1 | 1/2002 | Yamada | |
| 2003/0038954 A1 * | 2/2003 | Odagiri et al. | 358/1.9 |
| 2003/0058466 A1 * | 3/2003 | Hoshuyama | 358/1.9 |
| 2004/0145590 A1 * | 7/2004 | Yu et al. | 345/603 |
| 2005/0018226 A1 * | 1/2005 | Chiba | 358/1.9 |
| 2005/0046883 A1 | 3/2005 | Chiba | |
| 2007/0247532 A1 * | 10/2007 | Sasaki | 348/231.99 |

FOREIGN PATENT DOCUMENTS

| | | |
|---|---|---|
| JP | 5-24403 | 9/1993 |
| JP | 8-275007 | 10/1996 |
| JP | 10-164381 | 6/1998 |
| JP | 2000-125141 | 4/2000 |
| JP | 2001-359114 | 12/2001 |
| JP | 2003-101803 | 4/2003 |

OTHER PUBLICATIONS

English Language Abstract of JP 10-164381, Nov. 29, 1996.
English language Abstract of JP 2003-101803, Apr. 4, 2003.
English language Abstract of JP 2000-125141, Apr. 28, 2000.
English language Abstract of JP 5-24403, Sep. 21, 1993.
English language Abstract of JP 8-275007, Oct. 18, 1996.
English language Abstract of JP 2001-359114, Dec. 26, 2001.

* cited by examiner

*Primary Examiner*—Tuan Ho
*Assistant Examiner*—Kent Wang
(74) *Attorney, Agent, or Firm*—Greenblum & Bernstein, P.L.C.

(57) ABSTRACT

A color space transformation matrix calculating method is provided that calculates a color space transformation matrix which transforms colors in a first color space to colors in a second color space. The method optimizes a plurality of constant color-space transformation matrices, so that each of the constant color-space transformation matrices is adjusted to transform each standard color in the first color space to each goal color in the second color space, which correspond to each of the standard colors. The method further calculates interpolation functions for each matrix element of a color-space transformation matrix applied for the entire gamut of the first color space, based on the constant color-space transformation matrices.

20 Claims, 9 Drawing Sheets

US 7,671,898 B2

COLOR-SPACE TRANSFORMATION-MATRIX CALCULATING METHOD AND IMAGE PROCESSING DEVICE

BACKGROUND OF THE INVENTION

1. Field of the Invention

The present invention relates to a color adjusting method that optimizes color signals to improve the reproduction of color in an image, and an image processing device applying the method. More particularly, the invention relates to a color adjusting method using a color-space transformation-matrix.

2. Description of the Related Art

Generally, a color space of an image input system, such as an image capturing apparatus, is different from a color space of an image output system, such as a display and a printer. For example, perceived color of a reproduced image, when a captured image is displayed on a monitor, is generally different from that of an original subject. Further, the difference between the perceived colors also depends on the properties of each output device.

Accordingly, color signals based on the sRGB standard which is a standard for the image input devices and image output devices, are generally used at present. The image input device outputs color signals after transforming the obtained RGB signals to signals based on the sRGB standard. Thereby, precise color reproduction is performed as long as the image output devices are compatible with the sRGB standard. Namely, tints quite similar to the original object can be reproduced. A variety of methods for performing color adjustment are known in the art. For example, the reproduced color can be converted to the original color by adjusting the spectrum characteristics of an optical filter, provided in an imaging system, to the sRGB standard or by transforming the RGB signals electronically by a matrix transformation.

Conventionally, multiple linear regression analysis is used to improve the accuracy of color transformation methods that use a color space transformation matrix for electronic color adjustment. Multiple linear regression analysis optimizes the matrix elements of the color-space transformation-matrix by a statistical analysis which considers the relationship between the original color and the reproduced color as a cause and effect relationship. Namely, the matrix elements are obtained by optimizing these elements under the condition that the difference between the signal levels of the predicted reproduced colors, which is obtained by performing a provisional color space transformation matrix operation on the RGB signals from the imaging system, and the signal levels of the original colors, is below or equal to a permissible value. For example, a method that uses multiple linear regression analysis to provide a matrix that transforms RGB signals to XYZ signals of a different calorimetric system is disclosed in the Japanese unexamined patent publication (KOKAI) No. 10-164381.

SUMMARY OF THE INVENTION

However, the transformation from the color space of the image input system to the standard color space (e.g., sRGB) is generally a non-linear transformation, so that it is ineffective to sufficiently compensate for all of the color differences when the color compensation is carried out by a color space transformation matrix having constant element values, as in the conventional method.

According to the present invention, a color space transformation matrix calculating method is provided that calculates a color space transformation matrix which transforms colors in a first color space to colors in a second color space. The method optimizes a plurality of constant color-space transformation matrices, so that each of the constant color-space transformation matrices is adjusted to transform each standard color in the first color space to each goal color in the second color space, which correspond to each standard color. The method further calculates interpolation functions for each of the matrix elements of a color-space transformation matrix applied for the entire gamut of the first color space, based on the constant color-space transformation matrices.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
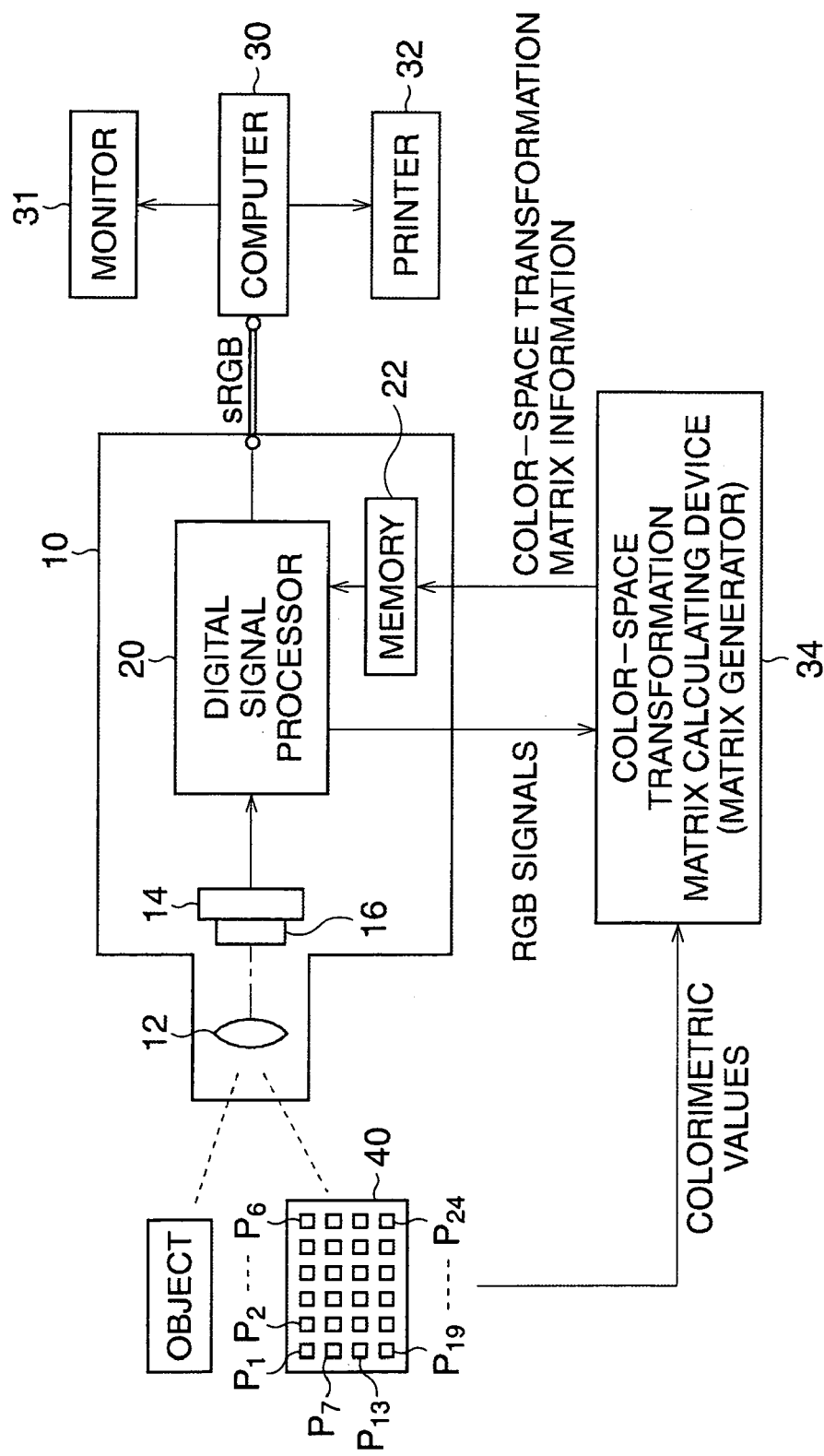
FIG. 1 schematically illustrates a system for calculating the color space transformation matrix of a first embodiment of the present invention.

The present invention is described below with reference to the embodiments shown in the drawings.

FIG. 1 schematically illustrates a system for calculating the color space transformation matrix of a first embodiment of the present invention.

In the first embodiment, the digital still camera 10 is employed as an example of an image input device, which is provided with an image signal processor relating to the invention. The digital still camera 10 generally includes an imaging optical system 12, an imaging device, such as a CCD 14, a digital signal processor 20, and a memory 22. An image detected by the imaging device 14 through the imaging optical system 12 is output as analog image signals, and subjected to analog signal processes. The analog image signals are then subjected to A/D conversion and fed to a digital signal processor 20 as digital image signals.

At the digital signal processor 20, a color separation process, a white balance adjusting process, a color adjusting process, and a gradation adjusting process (γcorrection), are carried out based on a predetermined order. The color separation process, for example, generates predetermined color signals for each of the pixels in accordance with the digital image signals. The white balance adjusting process optimizes gains for each of the color signals in accordance with the standard white signal values. The color adjusting process transforms color signals of the first color space of the image input system to color signals of the second color space. The gradation adjusting process optimizes the gradation to counterbalance the gamma characteristics of the monitor 31.

In the present embodiment, RGB signals are employed as color signals of the first color space and standard RGB signals, which are standardized among image output devices, are employed as color signals of the second color space. Further, in the present embodiment, sRGB signals, that is an international standard for color reproduction which is standardized by IEC (International Electrotechnical Commission), are adopted as the standard RGB signals of the second color space. Namely, in the present embodiment, the RGB signals of the first color space, obtained by the photographing system, are transformed to the sRGB signals in the second color space.

Further, the digital signal processor 20 can be connected to external devices, such as a computer 30, via an interface, so that the sRGB signals which have already been subjected to the color adjusting process, are output to image output devices, such as a monitor 31 (CRT or LCD) and/or a printer 32 connected to the computer 30.

Generally, the color adjusting process is carried out by using a color-space transformation-matrix. As will be described later, the color-space transformation matrix is optimized so as to transform a plurality of standard colors represented in the first color space, which were imaged by the digital still camera 10, to colors (goal colors) that are desired in the second color space. In the present embodiment, the color-space transformation-matrix is obtained by a color-space transformation-matrix calculating device or a matrix generator 34, at the final stage of the manufacturing processes of the digital still camera 10, and information relating to the color-space transformation-matrix is stored in a memory 22 of the digital still camera 10.

Note that, values of RGB signals of the goal colors in the second color space are preset in the matrix generator 34 and RGB signals of the first color space, which are obtained by imaging the standard colors, are input from the digital still camera 10. For example, as in the present embodiment, when improving color reproduction performance, the goal colors of the second color space are preset based on colorimetric values of the standard colors. For example, the plurality of standard colors may be selected so as each of the colors is distributed uniformly over a uniform color space. However, a ready-made color chart checker available in the market may also be used (in consideration of ease of purchase and saving time and expense), for the calorimetric operations.

Further, since the present embodiment aims to achieve precise color reproduction, the objective values (goal colors) that are set for calculating the color-space transformation-matrix are preset to the colorimetric values of the color standard colors. However, when it is desirable to reproduce particular colors, such as human skin color or a blue-sky color, as preferred colors and not the precise colors, the objective values (goal colors) relating to particular standard colors may be preset to values which are modified from the calorimetric values. Note that, in the description of the present embodiment, the Macbeth color checker 40 (registered trademark) is used as an example of the standard colors.

The Macbeth color checker 40 has 24 color patches $P_1$-$P_{24}$ as described in FIG. 1 (only part of the color patches are numbered for convenience), and eighteen color patches ($P_1$-$P_{18}$), excluding six achromatic or gray scale color patches, are used as the above standard colors. Namely, the precise calorimetric values of the color patches $P_1$-$P_{18}$ (which are obtained by a calorimeter) in the second color space are set as the goal colors. Further, the color patches $P_1$-$P_{18}$ as the standard colors are imaged by the digital still camera 10 under the same illumination conditions adopted in the color determination carried out by the colorimeter, and the RGB signals of the color patches (standard colors), obtained by the digital still camera 10, will be the color signals of the standard colors in the first color space.

Since the Macbeth color checker 40 is a ready-made item on the market, it is easy to obtain. Further, since the calorimetric values of the patches $P_1$-$P_{24}$ are already known, it can save time and expense for the calorimetric operations. Further, the color chart is not restricted to the Macbeth color checker chart described in the present embodiment, but can also be a color chart of which color patches are distributed uniformly over uniform color space, such as the JIS standard color chart. Moreover, when a peculiar color chart that includes the specific colors (human skin color, blue sky color, and verdure color), which may appear frequently in photography, is prepared and used according to an object, these specific colors can be reproduced with fidelity.

Figure 2:
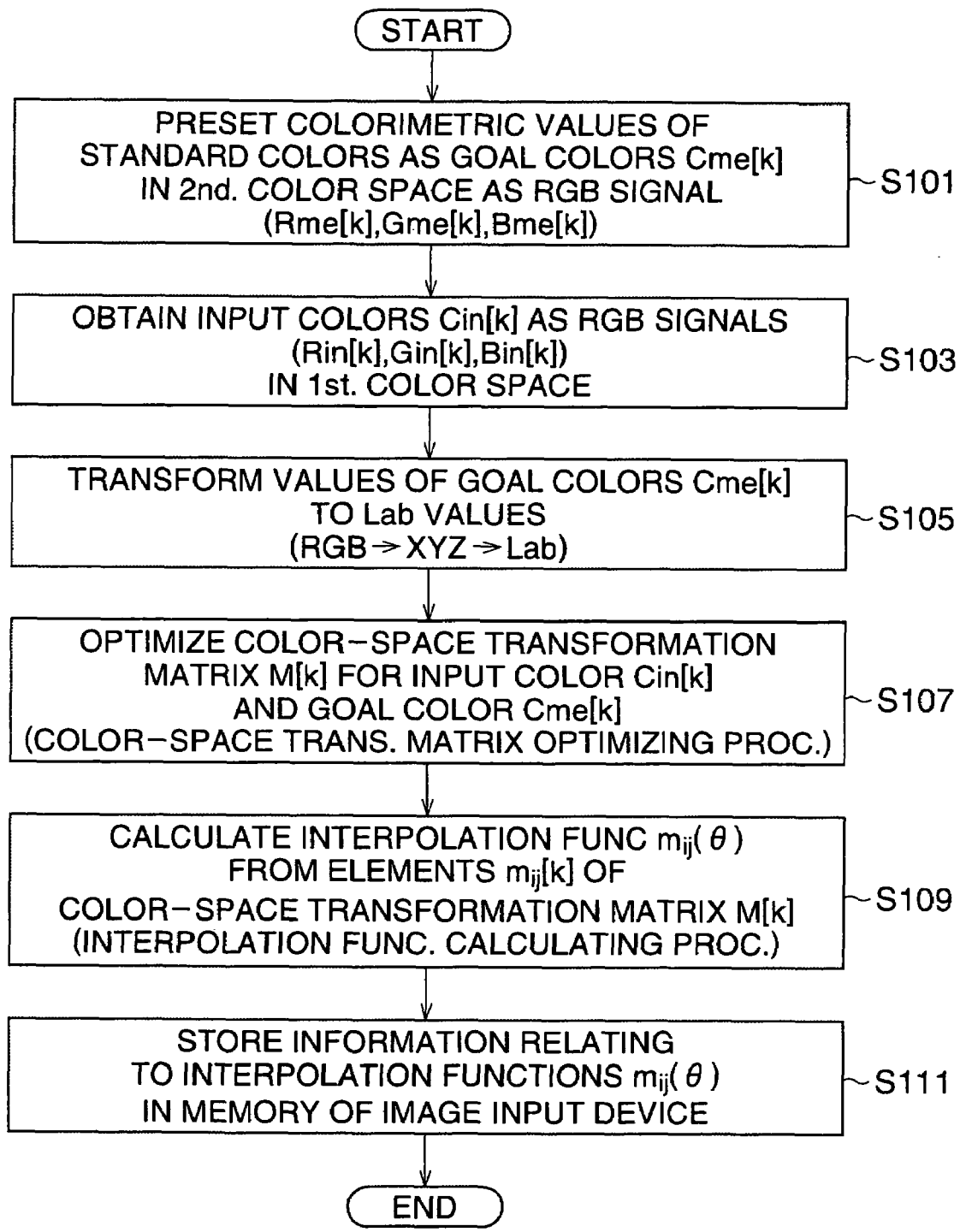
FIG. 2 is a flow chart of a color-space transformation-matrix calculating process.

Next, with reference to the flow chart of the color-space transformation-matrix calculating process in FIG. 2, the color-space transformation-matrix calculating method using the matrix generator 34 in the present embodiment is explained.

In conventional color compensation which applies a color-space transformation matrix, the matrix elements of the color-space transformation-matrix are constants so that all of the colors in the first color space are transformed to colors in the second color space by one linear transformation. However, correspondence between the first color space and the second color space cannot be represented by a linear transformation. Therefore, a color-space transformation using a color-space transformation-matrix with constant matrix elements is only an approximate transformation. In this case, for example, the color-space transformation matrix is normally optimized in order to minimize the total error appearing over the gamut. In actual calculation of the optimization, the color-space transformation matrix is obtained by means of minimizing the total error generated in the color-space transformation performed on the plurality of standard colors.

However, according to the above-mentioned conventional method, the transformation from the first color space to the second color space is not always sufficiently precise or minute. Therefore, in the present embodiment, the matrix elements of the color-space transformation matrix are considered as functions of independent variable(s) including coordinate(s) of an input color. Thereby, the color-space transformation matrix which is accommodated for each of the points (colors) in the first color space can be determined as to the coordinates of each point. Namely, in the present embodiment, the constant color-space transformation matrices (which have constant matrix elements) for each of the standard colors are obtained at first. Each of the constant color-space transformation matrices transforms the coordinates of corresponding standard color in the first color space to appropriate coordinates in the second color space. A color-space transformation matrix having variable elements, which can be adjusted to all colors including the standard colors, is then obtained based on the constant color-space transformation matrices that are optimized for each of the standard colors. Namely, an arbitrary color (coordinates) in the first color space is transformed to a color (coordinates) in the second color space by the color-space transformation matrix of which the variable matrix elements can be adjusted to an arbitrary color.

In Step S101, the RGB signals (Rme[k], Gme[k], Bme[k]), which correspond to the colorimetric values of the color patches $P_1$-$P_{18}$ or the standard colors, are preset in the matrix generator 34 as the goal colors Cme[k] (k=1-18) in the second color space. In Step S103, the color patches $P_k$ (k=1-18) are imaged by the digital still camera 10, and the RGB signals (Rin[k], Gin[k], Bin[k]), which correspond to each of the color patches $P_k$, are output from the digital still camera 10 to the matrix generator 34 as the input colors Cin[k] (k=1-18) in the first color space.

In Step S105, the RGB signals (Rme[k], Gme[k], Bme[k]) of the goal colors Cme[k] are transformed to the L*a*b* signals (L*me[k], a*me[k], b*me[k]) of the CIE-L*a*b* color space (simply referred to as Lab color space in the following), which is a uniform color space. In Step S107, the color-space transformation matrices (having constant elements) are optimized for each of the standard colors (color patches $P_k$, k=1-18) based on the input colors Cin[k] and the goal colors Cme[k] (k=1-18), which correspond to each of the standard colors (color-space transformation matrix optimizing process). Note that, the color-space transformation matrices (having constant matrix elements) optimized for each of the standard colors (color patches $P_k$) will be referred to as matrices M[k] (k=1-18) in the following.

In Step S109, interpolation functions mij(θ) for the matrix elements of the variable color-space transformation matrix are obtained based on the constant matrix elements mij[k] of the color-space transformation matrices M[k], where the variable "θ" represents the hue angle. Further, in Step S111, the information relating to the interpolation functions mij(θ) is fed to the digital still camera (the image input device) 10 and stored in the memory 22, and thus the color-space transformation matrix calculating process of the present embodiment ends.

Figure 3:
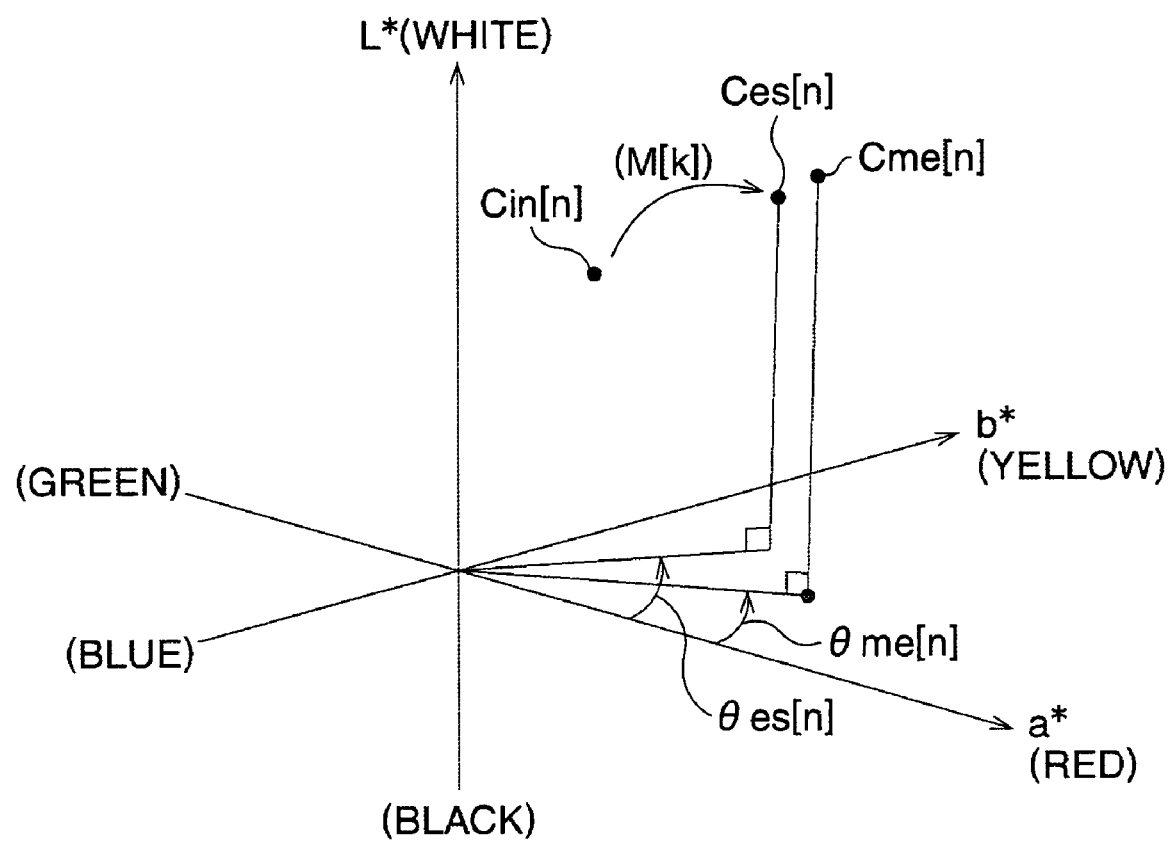
FIG. 3 is a block diagram schematically showing processes that are carried out in the color space transformation matrix calculating process and the relationships between each of the color signals.
Figure 4:
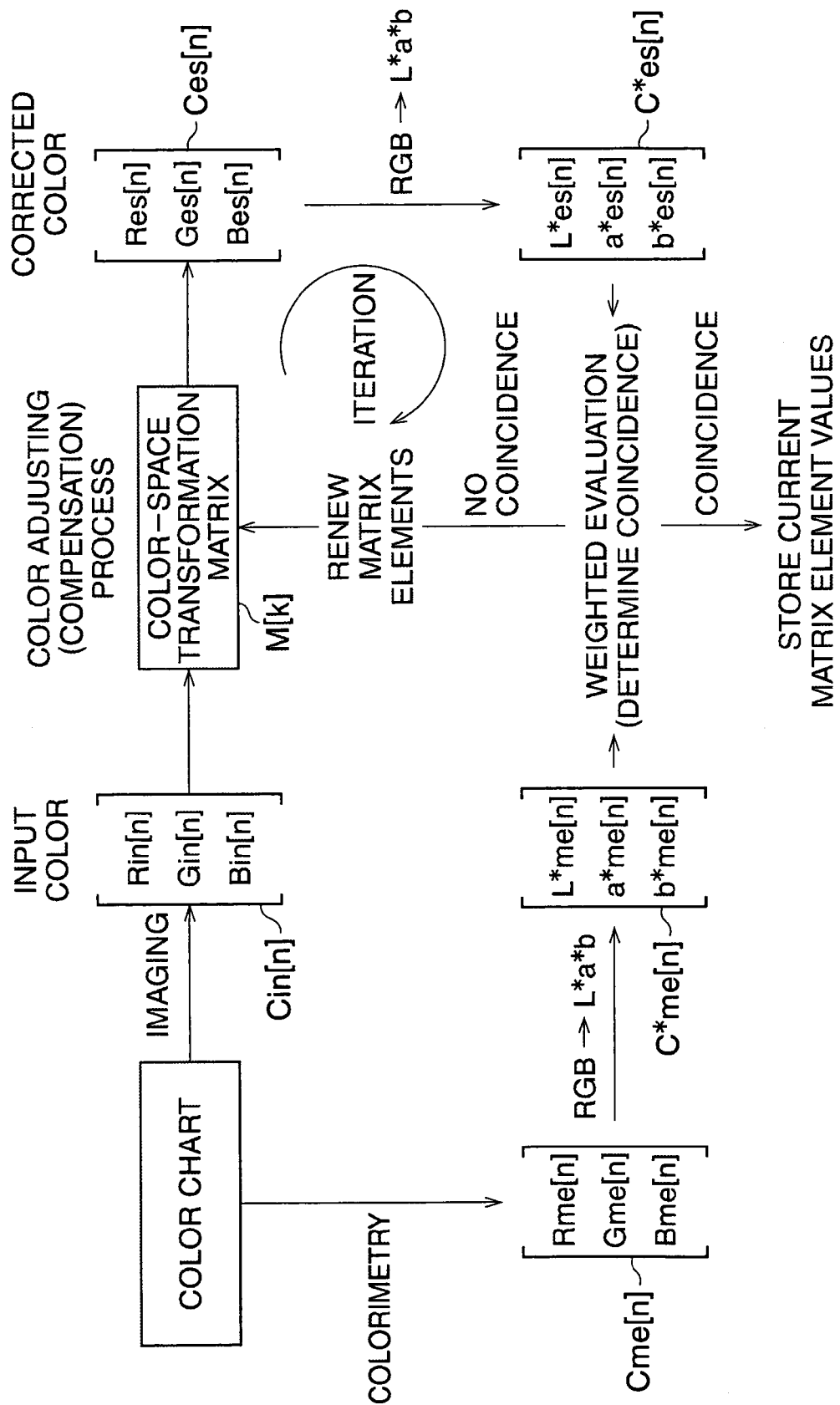
FIG. 4 is a block diagram that illustrates a color-space transformation matrix optimizing process.
Figure 5:
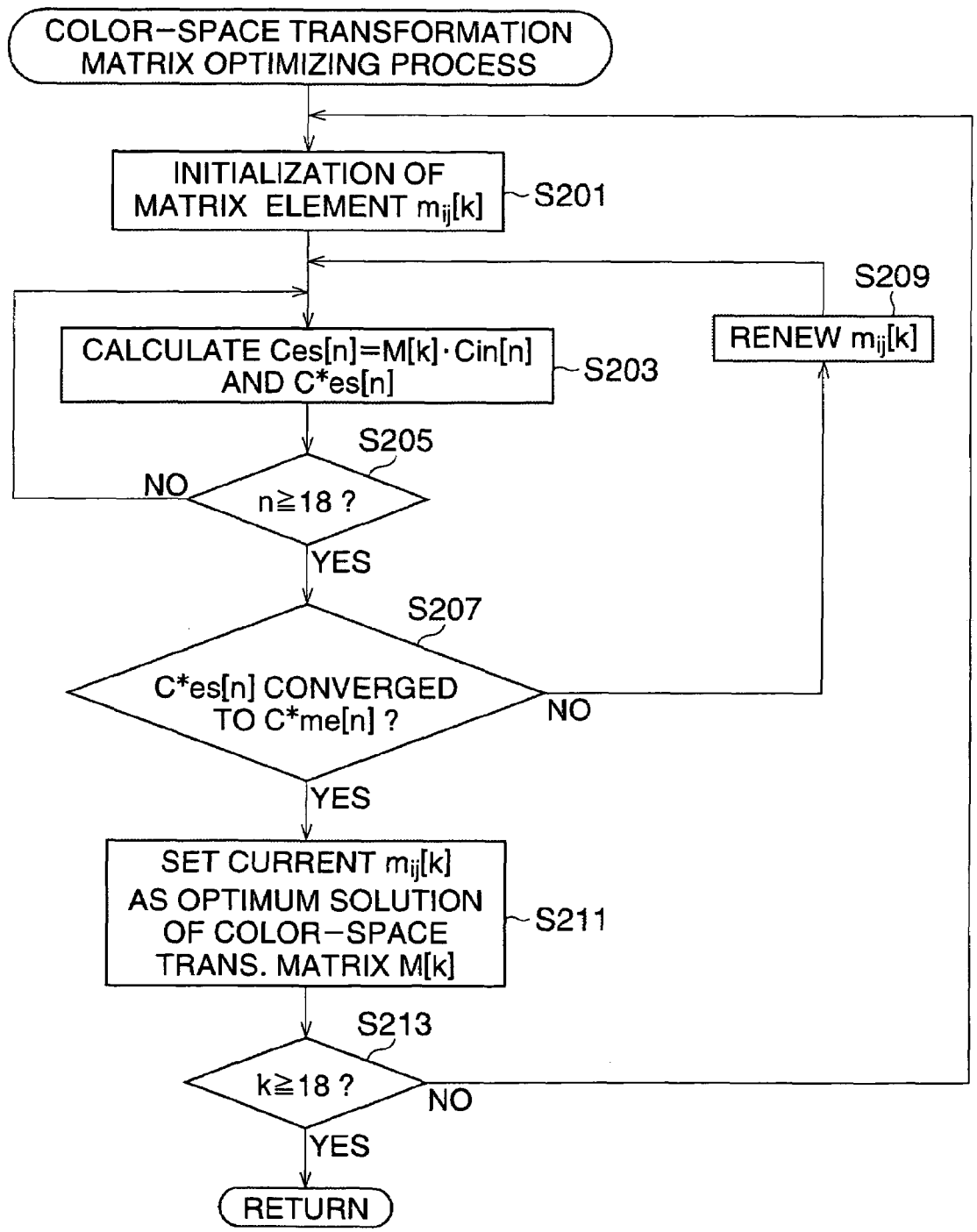
FIG. 5 is a flowchart of the color-space transformation matrix optimizing process.

Next, with reference to FIGS. 3-5, the color-space transformation matrix optimizing process, which is carried out in Step S107 of FIG. 2, will be explained. Note that, FIG. 3 schematically illustrates the Lab color space in which a light source having a predetermined color temperature, is used for illumination. Further, FIG. 4 is a block diagram that illustrates the color-space transformation matrix optimizing process and FIG. 5 is a flowchart thereof.

Generally, the color compensation process, which uses the color-space transformation matrix to transform an input color to a corrected color, is described by a linear equation, such as Eq. (1), when denoting "Cin" as an input color, "M" as the color-space transformation matrix, and "Ces" as a corrected color. Further, Eq. (1) can also be described by Eq. (2) by using the matrix elements {mij} (i,j=1,2,3). Here, (Rin, Gin, Bin) and (Res, Ges, Bes) represent RGB signals (RGB coordinates) of the input color Cin and the corrected color Ces.

$$Ces = M \cdot Cin \qquad (1)$$

$$\begin{pmatrix} Res \\ Ges \\ Bes \end{pmatrix} = \begin{pmatrix} m_{11} & m_{12} & m_{13} \\ m_{21} & m_{22} & m_{23} \\ m_{31} & m_{32} & m_{33} \end{pmatrix} \begin{pmatrix} Rin \\ Gin \\ Bin \end{pmatrix} \qquad (2)$$

In the following description, in order to avoid confusion between the indexes of the color-space transformation matrices being subjected to the optimizing process and the indexes of the standard colors which are used in the optimizing process, the index of the color-space transformation matrices, which are subjected to the optimizing process, is referred to as "k", and the index of the standard colors (input colors) and the corresponding corrected colors, which are used in the optimizing process, is referred to as "n" (n=1-18). As described in Eqs. (3) and (4), the standard colors (input colors) Cin[n] are transformed to the corrected colors Ces[n] by the color-space transformation matrix M[k].

$$Ces[n] = M[k] \cdot Cin[n] \qquad (3)$$

$$\begin{pmatrix} Res[n] \\ Ges[n] \\ Bes[n] \end{pmatrix} = \begin{pmatrix} m_{11}[k] & m_{12}[k] & m_{13}[k] \\ m_{21}[k] & m_{22}[k] & m_{23}[k] \\ m_{31}[k] & m_{32}[k] & m_{33}[k] \end{pmatrix} \begin{pmatrix} Rin[n] \\ Gin[n] \\ Bin[n] \end{pmatrix} \qquad (4)$$

Note that, in the present embodiment, the color-space transformation matrices M[k] are obtained by the damped least square method. Each of the color-space transformation matrices M[k] is calculated by using all of the standard colors ($P_1$-$P_{18}$) while weighting the standard color $P_k$. Further, the optimization is not restricted to the damped least square method. Any optimizing methods known in the art and combinations thereof can also be used.

In the Lab color space of FIG. 3, an input color Cin[n] that corresponds to a standard color ($P_n$), a corrected color Ces[n] that is obtained by multiplying a non-optimized color-space transformation matrix M[k] and input color Cin[n], and a goal color Cme[n] obtained by calorimetric measurement of the standard color ($P_k$), are indicated.

As it is shown in FIG. 4, in the present embodiment, the matrix operations are performed on the RGB signals. However, a uniform color space, such as the Lab color space, is used to evaluate the coincidence between the colors. Namely, the RGB signals (Rme[n], Gme[n], Bme[n]) of the goal color Cme[n] and (Res[n], Ges[n]), Bes[n]) of the corrected color Ces[n] are transformed to the L*a*b* signals (L*me[n], a*me[n], b*me[n]) and (R*es[n], G*es[n], B*es[n]), which will be referred to as the Lab signals in the following, so that the coincidence between the colors is evaluated in the Lab color space.

This is because distance in the uniform color space, such as the Lab color space, is associated with the color difference perceived by the human eyes. Therefore, from a point of view of improving the performance of color reproduction, a uniform color space other than the Lab color space can also be used based upon requirements (precision or use), if the color space is associated with the color difference perceived by the human eye. Further, when the embodiment is applied to an object other than for precise color reproduction, a color space other than a uniform color space can also be used. In such case, standard colors may be selected from the selected color space so as the standard colors to be distributed uniformly over the selected color space.

Note that, the transformation from RGB signals to Lab signals is performed by using the following well known Eqs. (5) and (6). Eq. (5) is a formula for transforming the RGB signals to the XYZ signals. Eq. (6) is a formula for transforming the XYZ signals to the Lab signals. When evaluating the coincidence of colors, the RGB signals are transformed to the Lab signals via the XYZ signals.

$$\begin{pmatrix} X \\ Y \\ Z \end{pmatrix} = \begin{pmatrix} 0.4124 & 0.3576 & 0.1805 \\ 0.2126 & 0.7152 & 0.0722 \\ 0.0193 & 0.1192 & 0.9505 \end{pmatrix} \begin{pmatrix} R \\ G \\ B \end{pmatrix} \quad (5)$$

where, a viewing angle of a standard observer is 2° and the standard CIE-D$_{65}$ illumination is used.

$$L^* = 116 \times f(Y) - 16$$

$$a^* = 500 \times \{f(X) - f(Y)\}$$

$$b^* = 200 \times \{f(Y) - f(Z)\} \quad (6)$$

where
 $f(X) = X^{1/3}$ when $X/95.047 \leqq 0.008856$,
 $f(X) = 7.787X + 16/116$ when $0.008856 < X/95.047$,
 $f(Y) = Y^{1/3}$ when $Y/100.000 \leqq 0.008856$,
 $f(Y) = 7.787Y + 16/116$ when $0.008856 < Y/100.000$,
 $f(Z) = Z^{1/3}$ when $Z/108.883 \leqq 0.008856$, and
 $f(Z) = 7.787Z + 16/116$ when $0.008856 < Z/108.883$.

When the color-space transformation matrix optimizing operation of FIG. 5 is started, the variable "k" is initialized as k=1, and Step S201 is carried out. In Step S201, the matrix elements mij[k] of the color-space transformation matrix M[k] are initialized and the variable "n" is initialized as n=1.

In Steps S203 and S205, the RGB signals (Rin[n], Gin[n], Bin[n]) of the standard color ($P_n$) is multiplied by the color-space transformation matrix M[k], so that the values of the corrected color (Res[n], Ges[n], Bes[n]) for each n=1-18 is obtained. Namely, in Step S203, Ces[n]=M[k]·Cin[n] is calculated and the values of the RGB signals of Ces[n] are transformed to the Lab signals corresponding to C*es[n]. In Step S205, whether n≧18 is determined. When n<18, the variable "n" is incremented by 1 and Step S203 is repeated. On the other hand, when n≧18, Step S207 is carried out.

In Step S207, the coincidence between C*es[n] and C*me[n] is evaluated, so that whether C*es[n]) has converged to C*me[n] is determined. For example, the convergence is evaluated by determining whether a merit function φ is below or equal to a predetermined threshold value.

When it is determined in Step S207 that C*es[n] has not yet converged to C*me[n], the values of the matrix elements mij[k] are renewed and the variable "n" is reset to "1" in Step 209, so that the process returns to Step S203. Namely, the values of the corrected color (Rme[n], Gme[n] Bme[n]) are obtained for the standard colors ($P_n$, n=1-18) based on the renewed matrix elements mij[k], and the above-described processes are repeated.

On the other hand, when it is determined, in Step S207, that C*es[n] has converged to C*me[n], the process proceeds to Step S211 and thus the current values of mij[k] are determined as the optimum solution of the color-space transformation matrix M[k], and Step S213 is carried out. In Step S213, whether k≧18 is determined. When k≧18, the optimum color-space transformation matrices for all of the standard colors ($P_n$) are obtained, so that this color-space transformation matrix optimizing process ends.

On the other hand, when it is determined k<18 in Step S213, the variable "k" is incremented by 1 and the process returns to Step S201. Namely, the optimizing process of the color-space transformation matrix M[k] for new value "k" is carried out.

Note that, in the present embodiment, the merit function φ is determined by Eq. (7), as an example.

$$\phi = \sum_{n=1}^{18} \Delta E_n^2 + D \sum_j^3 \sum_i^3 mij[k]^2 \quad (7)$$

where, $$\Delta E_n = W_n[k] \Delta e[n]$$

$$\Delta e[n] = \{(\Delta L^*[n])^2 + (\Delta a^*[n])^2 + (\Delta b^*[n])^2\}^{\frac{1}{2}}$$

$$\Delta L^*[n] = L^*_{me}[n] - L^*_{es}[n]$$

$$\Delta a^*[n] = a^*_{me}[n] - a^*_{es}[n]$$

$$\Delta b^*[n] = b^*_{me}[n] - b^*_{es}[n].$$

Here, $W_n[k]$ represents weight coefficients set for each of the standard colors $P_n$ (n=1-18) in the optimizing process of the color-space transformation matrix M[k]. Namely, in the present embodiment, the value of the weight coefficients Wn[k] are extremely large values compared to the values of the other weight coefficients Wn[k] (n≠k), so that color-space transformation matrix M[k] is optimized for the particular standard color ($P_k$). Note that, since human eyes are sensitive to a difference in hue, a term relating to the hue angle θ may also be incorporated into the merit function and the term may be heavily weighted.

In the optimizing process of the present embodiment, the matrix elements mij[k] are obtained so that the merit function φ is a minimum value for each of "k". Here, conditions for the merit function φ to take the minimum value are given by nine equations represented by Eq. (8).

$$\frac{\partial \phi}{\partial m_{ij}} = 0 \quad (i, j = 1, 2, 3) \quad (8)$$

Since the merit function φ is nonlinear with respect to the matrix elements mij[k], so that in the present embodiment, the merit function φ is linearized about the starting point $m_{ij}[k]^0$ in terms of the matrix elements mij[k], where the starting point corresponds to provisional values of the matrix elements used in the calculation of Step S203. By substituting the linearized merit function φ into Eq. (8), a linear equation with nine unknowns is obtained as Eq. (9).

$$\Delta m[k] = -(A^t \cdot A + D \cdot I)^{-1} \cdot A^t \cdot \Delta E \quad (9)$$

where, $$\Delta m[k] = \begin{pmatrix} \Delta m_{11}[k] \\ \Delta m_{12}[k] \\ \vdots \\ \Delta m_{33}[k] \end{pmatrix},$$

$$\Delta E = \begin{pmatrix} \Delta E_1 \\ \Delta E_2 \\ \vdots \\ \Delta E_{18} \end{pmatrix},$$

-continued $$A = \begin{pmatrix} a_{1\_1} & a_{1\_2} & \cdots & a_{1\_9} \\ a_{2\_1} & \cdots & \cdots & a_{2\_9} \\ \vdots & \vdots & \vdots & \vdots \\ a_{18\_1} & \cdots & \cdots & a_{18\_9} \end{pmatrix},$$

$$a_{i\_j} = \left. \frac{\partial \Delta E_i}{\partial m_{ij}} \right|_{m_{ij}=m_{ij}[k]^0}$$

Figure 6:
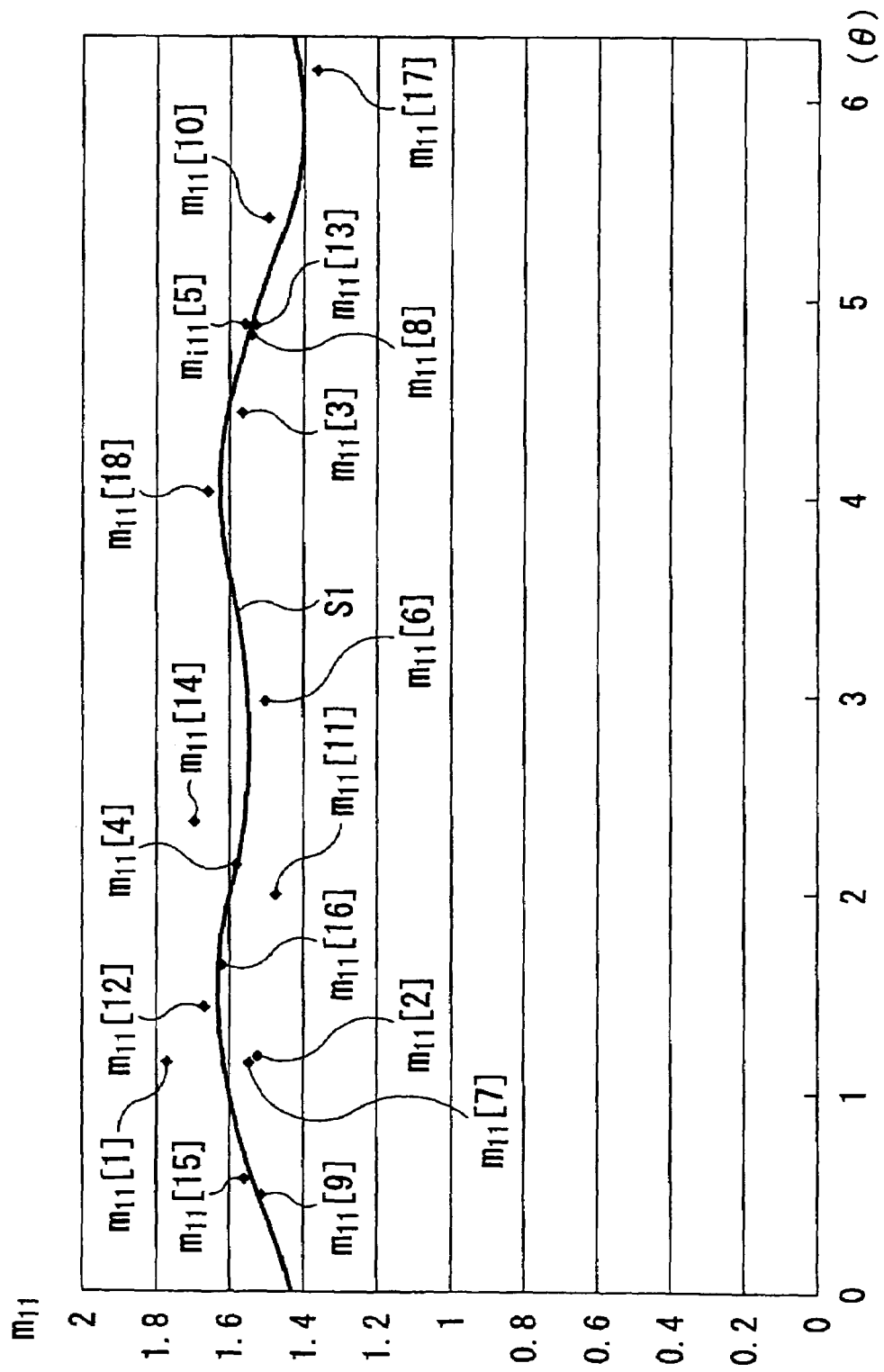
FIG. 6 is a graph where the values of matrix elements $m_{11}[1]$ to $m_{11}[18]$ and a interpolation function $m_{11}(\theta)$ are shown.

Here, $\Delta mij[k]$ represents displacement from the starting point $mij[k]^0$, so that in Step S209, the values $mij[k]^0+\Delta mij[k]$ replace the values of the starting point $mij[k]^0$ as new matrix elements $mij[k]$. Accordingly, the matrix elements $mij[k]$ are renewed in turn, in Steps S201-S209, so that the values of the matrix elements $mij[k]$ will converge to values that make the value of the merit function φ below or equal to the predetermined threshold value, and in turn $C^*es[n]$ converges to $C^*me[n]n$ Next, with reference to FIG. 6, an interpolation function calculating process, which is carried out in Step S109 of FIG. 2 is explained. FIG. 6 is a graph in which the values of the matrix elements $m_{11}[1]$-$m_{11}[18]$, which are obtained by the color-space transformation matrix optimizing process of Step S107, are plotted. The horizontal axis indicates the hue angle (radian) of a corresponding standard color ($P_k$) and the vertical axis indicates the value of the matrix elements.

In the present embodiment, the interpolation is carried out by the interpolation function $mij(\theta)$, which includes only the hue angle θ out of the coordinates of the Lab color space as an independent variable. In FIG. 6, as an example, the interpolation function $m_{11}(\theta)$, which is calculated from the values of the plotted matrix elements $m_{11}[1]$ to $m_{11}[18]$, is indicated as a solid line S1.

As the interpolation function $mij(\theta)$ of the present embodiment, a function that is continuous, smooth and that satisfies a periodic boundary condition is chosen. Further, the interpolation function is chosen from functions in which the value of the first order derivative of the interpolation function $mij(\theta)$ are kept within a range that does not obstruct smooth gradation. For example, the interpolation function of the present embodiment may be chosen as the function represented by Eq. (10).

$$mij(\theta)=A1_{ij}\cdot\sin(\theta)+A2_{ij}\cdot\cos(\theta)+A3_{ij}\cdot\sin(2\theta)+A4_{ij}\cdot\cos(2\theta)+A5_{ij} \quad (10)$$

Note that, the coefficients $A1_{ij}$ to $A5_{ij}$ are obtained by a method known in the art, including the least square method and the damped least square method. Although in FIG. 6, only the interpolation function $m_{11}(\theta)$ (when i=j=1) for the elements $m_{11}[k]$ (k=1-18) is indicated as the line S1, the interpolation functions $mij(\theta)$ for the other matrix elements $mij[k]$ are also calculated in the same way. Namely, for each of the interpolation functions $mij(\theta)$ where i,j=1, 2, 3, the coefficients $A1_{ij}$ to $A5_{ij}$ are calculated.

As described above, according to the present embodiment, the color-space transformation matrices adjusted to each of the standard colors, are obtained from the plurality of standard colors imaged by the image input device and the calorimetric value of the standard colors, and thereby the color-space transformation matrix optimized for arbitrary hue angle is obtained based on the color-space transformation matrices adjusted to each of the standard colors.

As it was described with reference to FIG. 2, the information relating to the interpolation function $mij(\theta)$ is stored in the memory 22 of the digital camera 10 in Step S111. As the information for the interpolation function $mij(\theta)$, the interpolation function itself including the coefficients $A1_{ij}$ to $A5_{ij}$ can be adopted. For another example, the Lab color space may be divided into smaller parts along the hue angle according to the required precision, so that the matrix elements mij representing each of the divisions may be obtained and stored in the memory 22 as a lookup table.

For example, when the Lab color space is equally divided into N sections along the hue angle, the values of the matrix elements $mij(\theta n)$ for $\theta n=(2n+1)\pi/N$ (n=0, 1, . . . , N-1) are stored in the memory 22. Namely, when the hue angle θ of an input color is included in the range $2n\pi/N \leq \theta < 2(n+1)\pi/N$, the color compensation is carried out by using the values of the matrix elements $mij(\theta n)$.

Figure 7:
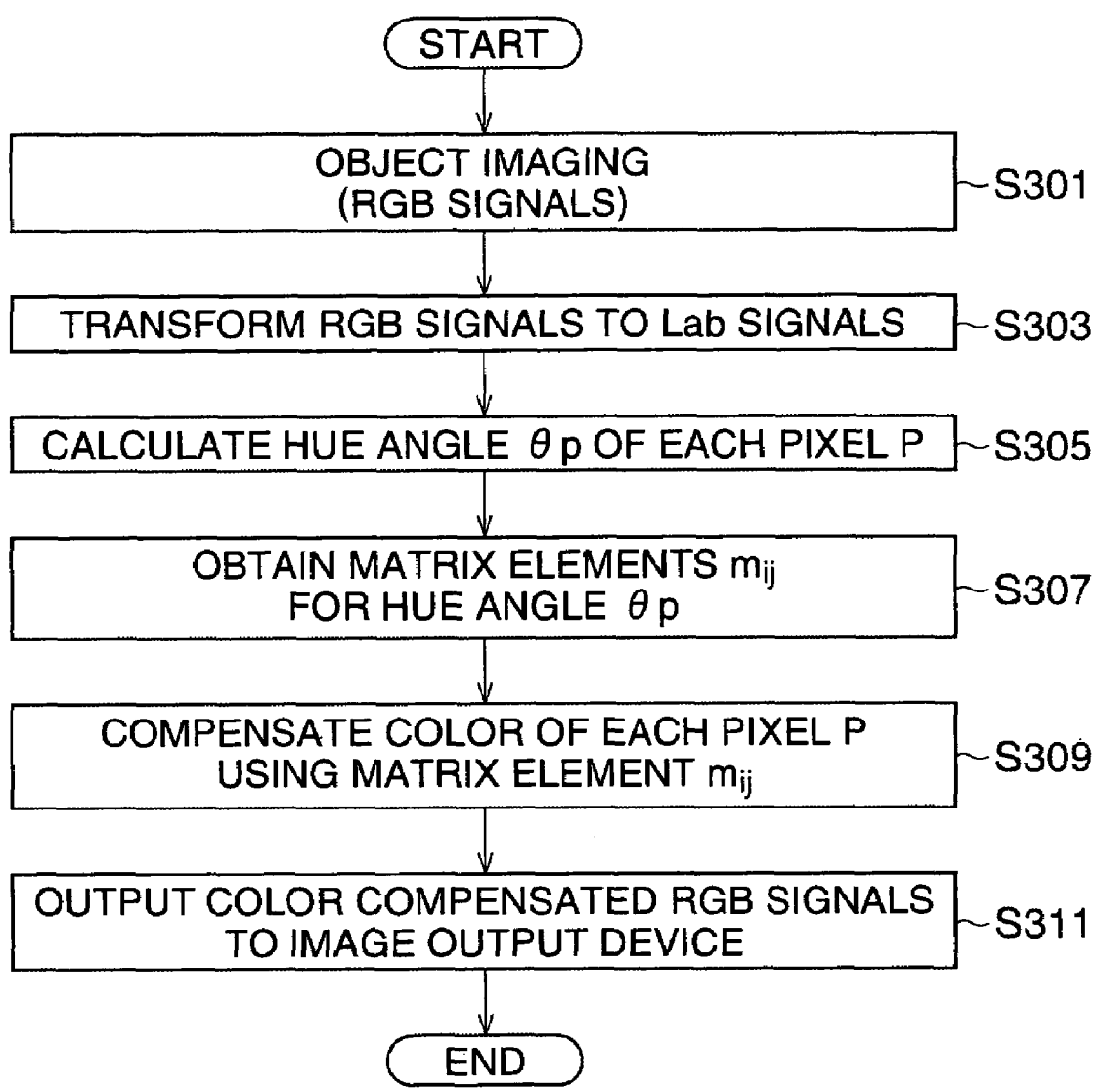
FIG. 7 is a flowchart of the signal processes carried out in the digital still camera when an image is captured.
Figure 8:
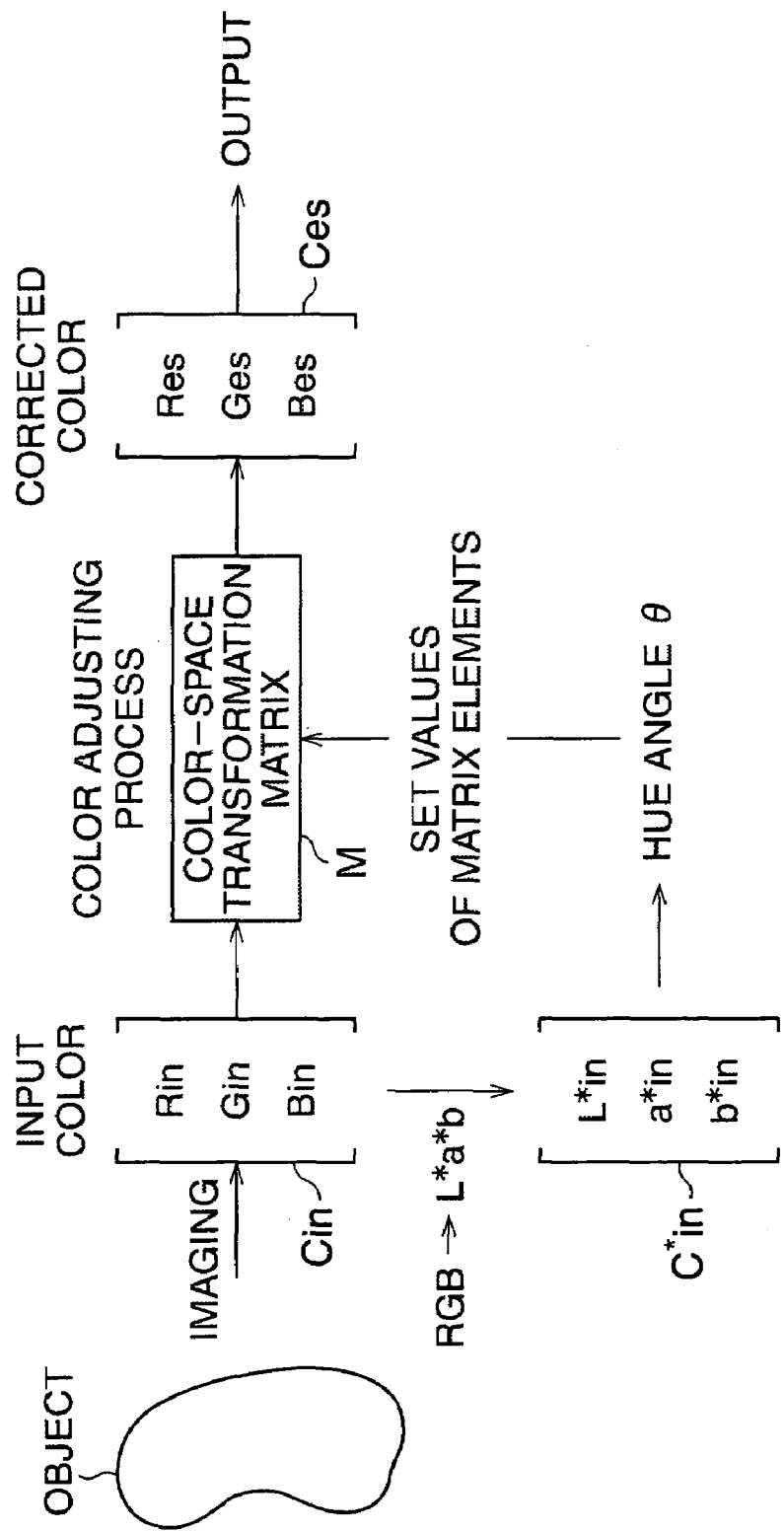
FIG. 8 is a block diagram that schematically illustrates the flow of the signal processes.

Next, with reference to FIGS. 1, 7, and 8, the color compensation process, corresponding to the color-space transformation matrices obtained by the color-space transformation matrix calculating process of the present embodiment, will be explained. FIG. 7 is a flowchart of the signal processes carried out in the digital still camera when an image is captured. Further, FIG. 8 is a block diagram that schematically illustrates the flow of the signal processes.

The above-discussed information relating to the interpolation function $mij(\theta)$ is stored in the memory 22 of the digital still camera 10 when the camera is shipped. When the digital still camera 10 captures the image of an object in Step S301, the object image is obtained by the imaging device 14 as RGB signals, for example. In Step S303, Lab signals of the image are obtained from the RGB signals.

In Step S305, the hue angle θp for each of the pixels "P" of the object image is calculated based on the Lab signals obtained in Step S303. In Step S307, the matrix elements mij for the hue angle θp are obtained. Namely, when the interpolation function $mij(\theta)$ including its coefficients are stored in the memory 22, the values of the matrix elements mij for the hue angle θp are calculated. When the values of the interpolation function $mij(\theta)$ are stored in the memory 22 as data, the values of the matrix elements mij corresponding to the hue angle θp are selected from the lookup table, for example.

In Step S309, the RGB signals of each of the pixels P of the object image are subjected to the color compensation process by using the matrix elements mij which are obtained for the hue angles θp of each of the pixels in Step S307. In Step S311, the RGB signals which are subjected to the color compensation are fed to the image output devices like the monitor 31 or the LCD on the digital still camera 10.

As described above, according to the first embodiment, input colors can be precisely transformed to desired colors and the color reproduction is improved. These outcomes are achieved by regarding the matrix elements of the color-space transformation matrix as functions of coordinates of the color space and obtaining interpolation functions of the matrix elements over the entire gamut of the first color space, based on the plurality of standard colors.

Note that, in the first embodiment, although the interpolation functions $mij(\theta)$ are obtained as functions including only the hue angle θ as an independent variable, in general, the interpolation functions $mij(\theta)$ may be functions of the hue angle θ, the saturation $r^*(=(a^{*2}+b^{*2})^{1/2})$, and the brightness $L^*$. Therefore, when more precise color compensation is required, the above-described method can be expanded to the interpolation function $mij(\theta, r^*, L^*)$ including all of the three variables (coordinates) or the interpolation function including two arbitrary variables, for example $mij(\theta, r^*)$.

Figure 9:
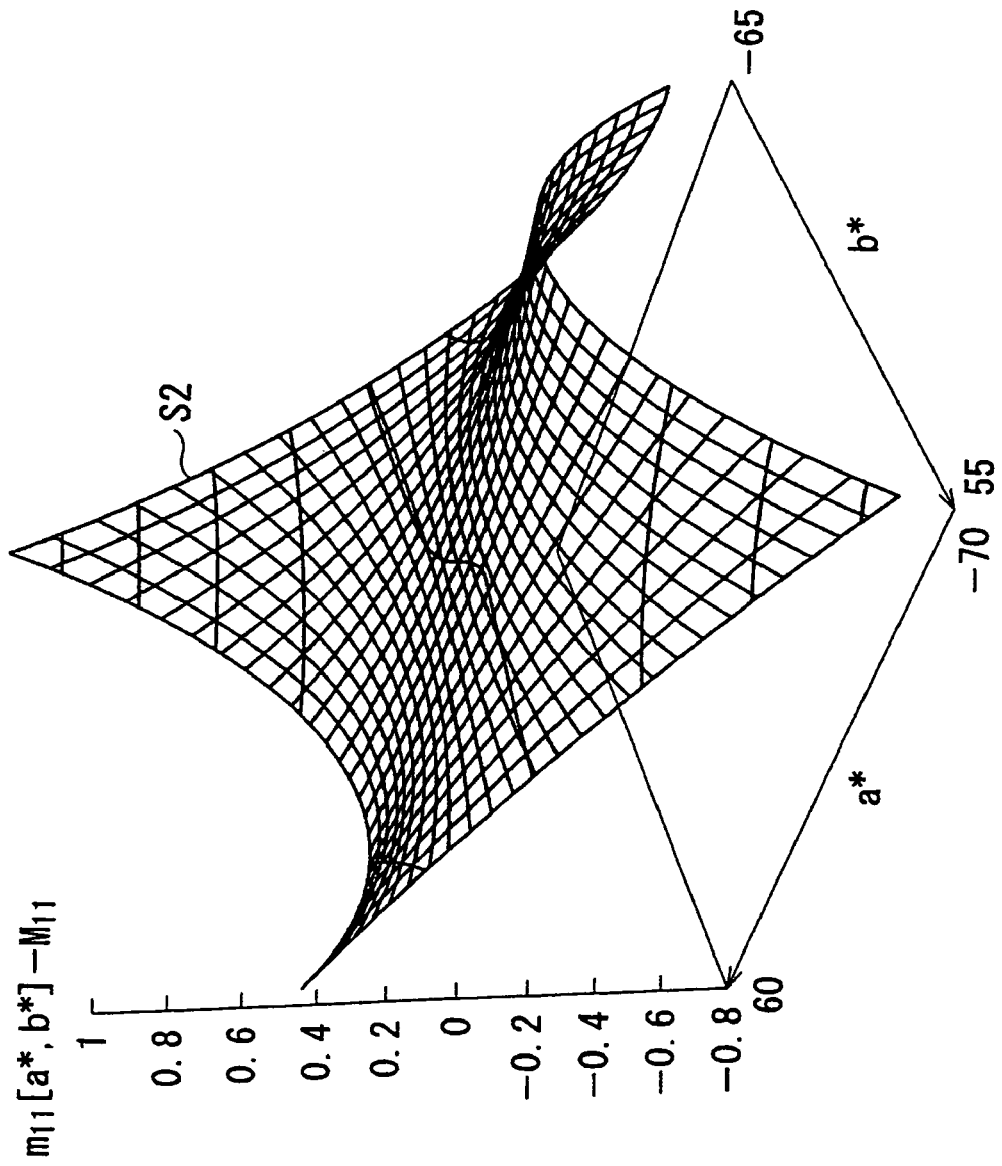
FIG. 9 is a graph that illustrates a solution of the interpolation function $m_{11}(a^*, b^*)$, which is indicated as the surface $m_{11}(a^*, b^*)$-$M_{11}$.

Next, with reference to FIG. 9, a second embodiment of the present invention will be explained. In the second embodiment, the a*-coordinate and the b*-coordinate of the Lab color space are adopted for the independent variables for the interpolation functions of the matrix elements mij. Namely, although in the first embodiment, the interpolation function based on circular cylindrical coordinates is used, in the second embodiment, a continuous and smooth interpolation function based on orthogonal Cartesian coordinates is used. Note that, the other structures are the same as those in the first embodiment.

For example, the interpolation function mij (a*, b*) in the second embodiment is a polynomial of a* and b*, as described in the following.

$$Mij(a^*, b^*) = Mij + B1ij \cdot a^{*1}b^{*0} + B2ij \cdot a^{*2}b^{*0} + B3ij \cdot a^{*3}b^{*0} + B4ij \cdot a^{*0}b^{*1} + B5ij \cdot a^{*1}b^{*1} \ldots + B11ij \cdot a^{*3}b^{*2} \ldots + B14ij \cdot a^{*2}b^{*3} + B15ij \cdot a^{*3}b^{*3}$$

where, Mij is the average of mij[k] (Σmij[k]/18). In FIG. 9, as similar to FIG. 6, a solution of the interpolation function $m_{11}$ (a*, b*), when i=j=1, is indicated as the surface S2: mij(a*, b*)−Mij.

Each of the coefficients B1ij to B15ij of the interpolation functions are calculated by a numerical analysis including the least square method and damped least squared method, similar to the first embodiment. Further, the information relating to the obtained interpolation functions is stored in the memory 22 of the digital still camera 10.

As the information for the interpolation function mij(a*, b*), the interpolation function itself including the coefficients B1ij to B15ij can be adopted. However, for another example, the Lab color space may be divided into smaller parts along the a*-axis and b*-axis, according to the required precision, so that the matrix elements mij representing each of the divisions may be obtained and stored in the memory 22 as a lookup table.

As described above, according to the second embodiment, an effect similar to the first embodiment can be obtained. Further, in the second embodiment, two independent variables are used for the interpolation function, so that more precise interpolation can be carried out.

Note that, one can appreciate that various variables and functions can be chosen for the interpolation function, and thus coordinate systems and functions other than those in the first and second embodiments can also be adopted. Further, the image input device is not restricted to the digital still camera 10 of the present embodiments, but it can also be any type of device, such as digital video camera, scanner, electronic endoscope, and the like. Further, in the present embodiments, the matrix generator 34 is configured as a device external to the digital still camera 10, however the matrix generating function may be incorporated into the digital still camera 10.

Furthermore, it may be configured as an image processing software application that is able to calculate the color space transformation matrix and is able to correct colors, so that the software may be installed in a personal computer system and the image signals from the digital still camera 10 are subjected to the color correction processes in the personal computer system.

In the present embodiments, the color space transformation matrix that adjusts the colors of the RGB signals obtained by the imaging system is based on the sRGB standard. However, the matrix calculating methods in the present embodiments are not restricted to the calculation of a matrix that is specific to this type of color correction. For example, a color-space transformation matrix that interactively transforms color signals between different color spaces, such as a transformation of RGB signals to XYZ signals or to CMYK signals for printing, and a transformation of CMY signals for complementary colors to RGB signals, may be calculated by the above-discussed method.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Applications No. 2005-021581 (filed on Jan. 28, 2005), which is expressly incorporated herein, by reference, in its entirety.

What is claimed is:

1. A color space transformation matrix calculating method that calculates a color space transformation matrix which transforms colors in a first color space to colors in a second color space, the method comprising:

optimizing a plurality of constant color-space transformation matrices, so that each of said constant color-space transformation matrices is adjusted to transform each standard color in said first color space to each goal color in said second color space, which correspond to each said standard color, wherein the optimizing includes:

calculating displacement of each matrix element based on conditions for a merit function such that the merit function takes a minimum value, the merit function being defined in a uniform color space, and renewing each matrix element repeatedly until the merit function is determined to have a value below or equal to a predetermined threshold value; and calculating interpolation functions for each matrix element of a color-space transformation matrix applied for the entire range of colors of said first color space, based on said constant color-space transformation matrices, wherein the interpolation functions are functions including a coordinate of a predetermined coordinate system of said uniform color space, as an independent variable.

2. A method according to claim 1, wherein said first color space and said second color space are not uniform color spaces.

3. A method according to claim 1, wherein said uniform color space is an L*a*b* color space and said independent variable comprises a hue angle.

4. A method according to claim 3, wherein said interpolation functions further comprise independent variables including saturation or brightness.

5. A method according to claim 3, wherein said interpolation functions are continuous and smooth functions that satisfy a periodic boundary condition in regard to said hue angle.

6. A method according to claim 1, wherein said uniform color space is an L*a*b* color space and said interpolation functions depend upon independent variables including coordinates of the a*-axis and b*-axis.

7. A method according to claim 6, wherein said interpolation functions comprise a polynomial of coordinates a* and b*.

8. An image signal processor, comprising:

a recording medium that stores information relating to a color-space transformation matrix that transforms colors in a first color space to colors in a second color space, said color-space transformation matrix being obtained by:

optimizing a plurality of constant color-space transformation matrices, so that each of said constant color-space transformation matrices is adjusted to transform each standard color in said first color space to each goal color in said second color space, which correspond to each said standard color, wherein the optimizing further includes:

calculating displacement of each matrix element based on conditions for a merit function such that the merit function takes a value the merit function being defined in a uniform color space, and renewing each matrix element repeatedly until the merit function is determined to have a value below or equal to a predetermined, threshold value; and calculating interpolation functions for each matrix element of a color-space transformation matrix applied for the entire range of colors of said first color space, based on said constant color-space transformation matrices, wherein the interpolation functions are functions including a coordinate of a predetermined coordinate system of said uniform color space, as an independent variable; and a first color signal transformer that transforms input color signals in said first color space to output color signals in said second color space, using the transformation matrix based on said information.

9. An image signal processor according to claim 8, further comprises a second color signal transformer that transforms color signals of an input color in said first color space to color signals in a predetermined uniform color space, and a value of said color-space transformation matrix is determined based on coordinates of said input color in said predetermined uniform color space and said information.

10. An image signal processor according to claim 9, wherein said information is stored in said recording medium as a lookup table based on a predetermined coordinate of said uniform color space.

11. An image signal processor according to claim 9, wherein said information is stored in said recording medium as information relating to said interpolation functions, so that a value of said color-space transformation matrix adjusted to said input color is obtained by calculating said interpolation functions.

12. The image signal processor according to claim 8, wherein said first color space and said second color space are not uniform color spaces.

13. The image signal processor according to claim 8, wherein said uniform color space is an L*a*b* color space and said independent variable comprises a hue angle.

14. The image signal processor according to claim 8, wherein said interpolation functions further comprise independent variables including saturation or brightness.

15. The image signal processor according to claim 8, wherein said interpolation functions are continuous and smooth functions that satisfy a periodic boundary condition in regard to said hue angle.

16. A digital camera, comprising:

a recording medium that stores information relating to a color-space transformation matrix that transforms colors in a first color space to colors in a second color space, said color-space transformation matrix is obtained by:

optimizing a plurality of constant color-space transformation matrices, so that each of said constant color-space transformation matrices is adjusted to transform each standard color in said first color space to each goal color in said second color space, which correspond to each said standard color, wherein the optimizing further includes:

calculating displacement of each matrix element based on conditions for a merit function such that the merit function takes a minimum value, the merit function being defined in a uniform color space, and renewing each matrix element recursively until the merit function is determined to have a value below or equal to a predetermined threshold value; and calculating interpolation functions for each matrix element of a color-space transformation matrix applied for the entire range of colors of said first color space, based on said constant color-space transformation matrices, wherein the interpolation functions are functions including a coordinate of a predetermined coordinate system of said uniform color space, as an independent variable; and a first color signal transformer that transforms input color signals in said first color space to output color signals in said second color space, using the transformation matrix based on said information.

17. The digital camera according to claim 16, wherein said first color space and said second color space are not uniform color spaces.

18. The digital camera according to claim 16, wherein said uniform color space is an L*a*b* color space and said independent variable comprises a hue angle.

19. The digital camera according to claim 16, wherein said interpolation functions further comprise independent variables including saturation or brightness.

20. The digital camera according to claim 16, wherein said interpolation functions are continuous and smooth functions that satisfy a periodic boundary condition in regard to said hue angle.

* * * * *